Patented Sept. 11, 1934

1,972,988

UNITED STATES PATENT OFFICE 1,972,988

QUINOLINE-8-AZO COMPOUNDS OF THE QUININE SERIES

Gustav Giemsa and Manfred Oesterlin, Hamburg, and Bruno Pützer, Wuppertal-Elberfeld, Germany, assignors to Winthrop Chemical Company, Inc., New York, N. Y., a corporation of New York No Drawing. Application June 11, 1932, Serial No. 616,750. In Germany August 8, 1931

4 Claims. (Cl. 260—86)

This invention relates to the manufacture of quinoline-8-azo compounds of the quinine series having probably the following general formula:

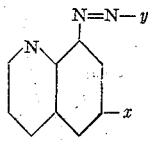

wherein $x$ is a hydrogen or an alkoxy group and $y$ the radical of hydrocuprein. The new products are generally reddish crystalline powders soluble in organic solvents, forming reddish salts with acids which are soluble in water.

The manufacture of the new compounds is effected according to the method customarily employed for the manufacture of azo compounds by coupling diazotized 8-aminoquinoline or a substitution product thereof with hydrocuprein or a substitution product thereof.

The hitherto unknown quinoline-8-azo hydrocuprein and the substitution products thereof are compounds, possessing a pronounced efficacy against malaria parasites considerably exceeding that of quinine and hydrocuprein.

Azo dyestuffs of hydrocuprein with aminoquinolines other than 8-aminoquinoline, for example, quinoline-6-azo-hydrocuprein are known (compare Journal Amer. Chem. Soc., 41, page 2131 et seq.). In contradistinction to the new compounds the known products, which are, moreover, very poisonous, do not exert any action on malaria parasites for all practical purposes.

The invention is illustrated by the following examples without being limited thereto:—

*Example 1.*—14.4 grams of 8-aminoquinoline are diazotized in 400 ccs. of N-hydrochloric acid at 0–10° C. by means of 70 ccs. of 10% sodium nitrite solution. The diazo solution is added to a solution of 49.2 grams of hydrocuprein dihydrobromide (+1 molecule of water of crystallization) in 1 litre of water, cooled by means of ice and sodium carbonate solution is gradually added with stirring until an alkaline reaction to litmus is obtained. The quinoline-8-azohydrocuprein separates as a red amorphous precipitate and after standing over-night is filtered by suction. After drying the crude product melts at 168° C. It exhibits only moderate powers of crystallization.

The salts of quinoline-8-azohydrocuprein with mineral and organic acids are readily soluble in water.

*Example 2.*—17.4 grams of 6-methoxy-8-aminoquinoline are heated for a short time to boiling with 400 ccs. of N-hydrochloric acid; after cooling to 0–10° C. the hydrochloride, which crystallizes out in a finely divided form, is diazotized by means of 70 ccs. of 10% sodium nitrite solution. The diazo solution is added to a solution of 49.2 grams of hydrocuprein dihydrobromide (+1 molecule of water of crystallization) in 1 litre of water, cooled by means of ice and sodium carbonate solution is gradually added with stirring at 0–10° C. until an alkaline reaction to litmus is obtained. The 6-methoxyquinoline-8-azohydrocuprein having the formula:

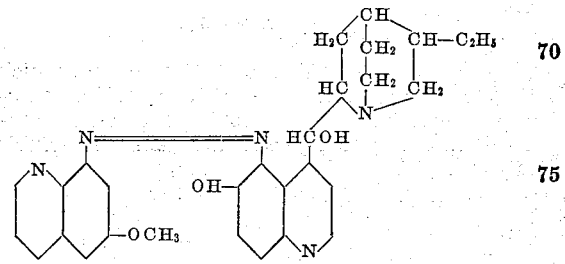

separates as a red, amorphous precipitate. After standing overnight it is filtered by suction and the dyestuff further purified by conversion into the hydrochloride. For this purpose the product is dissolved in excess dilute hydrochloric acid, filtered and sodium acetate solution is cautiously added. While the solution is still acid to Congo the dihydrochloride separates in a crystalline state. After crystallizing from methyl alcohol it is obtained in the form of dark red crystals, melting at 218° C. The free 6-methoxyquinoline-8-azohydrocuprein, obtainable from the above by means of ammonia, crystallizes from acetone in the form of bright red crystals, melting at 180° C.

The 6-ethoxyquinoline-8-azohydrocuprein dihydrochloride obtainable in an analogous manner yields red crystals melting at 208° C. and the 6-amyloxyquinoline-8-azohydrocuprein dihydrochloride crystals melting at 218° C.

*Example 3.*—3.5 grams of 6-methoxy-8-aminoquinoline are dissolved in 120 ccs. of N-sulfuric acid with the addition of water such that when ice-cold no separation of salt takes place. After diazotizing with the calculated quantity of sodium nitrite 20 ccs. of a saturated potassium acetate solution are added, followed by the gradual addition of a solution of 8 grams of hydrocuprein sulfonic acid in 60 ccs. of N-caustic soda lye. After standing for 20 hours in an ice box the product is filtered, washed and dried. To remove any unaltered hydrocuprein sulfonic acid still present the azo compound is dissolved in the smallest possible quantity of chloroform and after filtering is again dried. The resulting sulfonic acid, without further purification, undergoes no noticeable change in a melting point tube up to 270° C. It is heated without further working up with ten times the quantity of 25% hydrochloric acid for 2 hours on a briskly boiling water bath and the saponification product is precipitated by means of an excess of caustic soda lye. The hydrochloride derived therefrom melts at 218° C. and gives no depression when melted with the 6-methoxyquinoline-3-azohydrocuprein dihydrochloride obtainable in accordance with Example 2.

We claim:

1. The products having the following general formula:

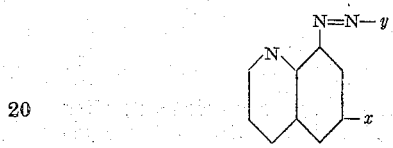

wherein $x$ is hydrogen or an alkoxy group and $y$ the radical of hydrocuprein, which products are generally reddish crystalline powders soluble in organic solvents, forming reddish salts with acids which are soluble in water.

2. The compounds of the formula:

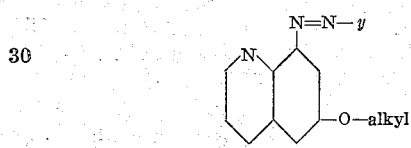

wherein $y$ is the radical of hydrocuprein, which products are generally reddish crystalline powders soluble in organic solvents, forming reddish salts with acids which are generally soluble in water.

3. 6-methoxyquinoline-8-azohydrocuprein of the formula:

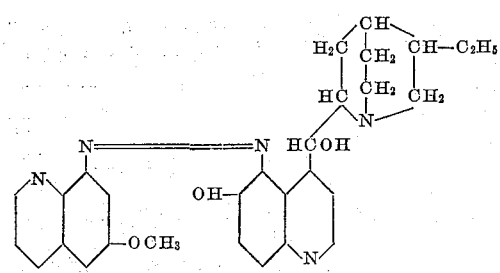

which in the form of its dihydrochloride crystallizes from methylalcohol in the shape of dark red crystals melting at 218° C. and in the form of its free base crystallizes from acetone in the shape of red crystals melting at 180° C.

4. 6-ethoxyquinoline-8-azohydrocuprein of the formula:

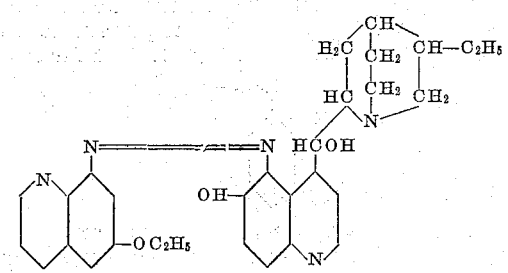

which in the form of its dihydrochloride crystallizes from ethylalcohol in the shape of dark red crystals melting at 208° C.

GUSTAV GIEMSA.
MANFRED OESTERLIN.
BRUNO PÜTZER.